(12) United States Patent
Sekiya

(10) Patent No.: US 8,390,844 B2
(45) Date of Patent: Mar. 5, 2013

(54) IMAGE PROCESSING APPARATUS FOR CREATING A JOB LOG

(75) Inventor: Makoto Sekiya, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1282 days.

(21) Appl. No.: 11/865,978

(22) Filed: Oct. 2, 2007

(65) Prior Publication Data

US 2009/0303518 A1 Dec. 10, 2009

(30) Foreign Application Priority Data

Oct. 3, 2006 (JP) ................................. 2006-272260

(51) Int. Cl.
*G06F 3/12* (2006.01)

(52) U.S. Cl. ............. 358/1.15; 736/26; 736/27; 736/28; 736/29; 736/30; 736/31; 736/32; 736/33; 399/8; 399/10; 399/79; 399/80; 399/372; 358/3.28; 358/1.16; 358/403

(58) Field of Classification Search .............. 726/26–33; 399/8, 10, 79, 80, 366, 372; 358/3.28, 1.15, 358/1.16, 403

See application file for complete search history.

(56) References Cited

U.S. PATENT DOCUMENTS

| | | | |
|---|---|---|---|
| 7,503,067 B2* | 3/2009 | Yeung et al. | 726/17 |
| 7,796,287 B2* | 9/2010 | Fukuta | 358/1.15 |
| 7,954,143 B2* | 5/2011 | Aaron | 726/11 |
| 2002/0042881 A1* | 4/2002 | Okigami | 713/200 |
| 2004/0156064 A1* | 8/2004 | Owen et al. | 358/1.13 |
| 2006/0119887 A1* | 6/2006 | Aritomi et al. | 358/1.15 |
| 2006/0187495 A1 | 8/2006 | Ueda et al. | |
| 2007/0067680 A1* | 3/2007 | Harada et al. | 714/45 |
| 2007/0094711 A1* | 4/2007 | Corley et al. | 726/3 |
| 2007/0220614 A1* | 9/2007 | Ellis et al. | 726/27 |
| 2009/0002744 A1* | 1/2009 | Shimada | 358/1.15 |

FOREIGN PATENT DOCUMENTS

| | | |
|---|---|---|
| CN | 1822636 | 8/2006 |
| JP | 2002-116901 | 4/2002 |
| JP | 2002-259103 | 9/2002 |
| JP | 2006-031181 | 2/2006 |
| JP | 2006-178939 | 7/2006 |

* cited by examiner

*Primary Examiner* — Benjamin O Dulaney
(74) *Attorney, Agent, or Firm* — Edwards Wildman Palmer LLP; David G. Conlin; Stephen D. LeBarron

(57) ABSTRACT

The present invention provides an image processing apparatus and an image processing system which facilitate management against unauthorized use by creating a job log according to a usage status of a user. A creation section creates a different job log for each individual user. The job log has storage conditions of image data included in the job log set according to a storage level. The storage conditions are a color of an image, a resolution of the image data and whether or not necessary to create OCR data of the image data. To increase efficiency of a follow-up research by using such a job log, the storage level of the image data relating to the user having performed unauthorized use is raised.

8 Claims, 7 Drawing Sheets

FIG. 4

| USER NAME | LOGIN NAME | NOTIFIED PARTY | IMAGE STORAGE LEVEL | IMAGE STORAGE CONDITION 1 (COLOR/MONOCHROME) | IMAGE STORAGE CONDITION 2 (RESOLUTION) | IMAGE STORAGE CONDITION 3 (WHETHER NECESSARY TO CREATE OCR DATA) |
|---|---|---|---|---|---|---|
| ADMINISTRATOR | admin | IP ADDRESS 192.168.XX.XXX | 3 | COLOR | NORMAL | NO |
| AAA | 1234 | IP ADDRESS 192.169.XX.XXX | 1 | MONOCHROME | NORMAL | NO |
| BBB | 2345 | IP ADDRESS 192.170.XX.XXX | 2 | MONOCHROME | HIGH-RESOLUTION | NO |
| CCC | 3456 | IP ADDRESS 192.171.XX.XXX | 4 | COLOR | HIGH-RESOLUTION | YES |
| DDD | 4567 | IP ADDRESS 192.172.XX.XXX | 3 | COLOR | NORMAL | NO |

FIG. 5

| JOB ID | JOB MODE | USER NAME | LOGIN NAME | STARTING TIME AND DATE | ENDING TIME AND DATE | TOTAL NUMBER OF MONOCHROME SHEETS | TOTAL NUMBER OF FULL-COLOR SHEETS | RESULT | DOCUMENT SIZE | PAPER SIZE | TWO-SIDE SETTING | IMAGE QUALITY /RESOLUTION | FILE FORMAT |
|---|---|---|---|---|---|---|---|---|---|---|---|---|---|
| 1 | COPY | AAA | 1234 | 2005-12-04T21:10 | 2005-12-04T21:10 | 0 | 0 | OK | A3 | A3 | ONE SIDE TO ONE SIDE | 600X300 | |
| 2 | PRINTER | BBB | 2345 | 2005-12-04T21:4 | 2005-12-04T21:42 | 1 | 0 | OK | A4 | A4 | ONE SIDE | 600X600 | |
| 3 | E-MAIL TRANSMISSION | CCC | 3456 | 2005-12-04T23:30 | 2005-12-04T23:32 | 13 | 0 | TRANSMISSION OK | A4 | A4 | ONE SIDE | 600X600 | PDF |
| 4 | FAX TRANSMISSION | AAA | 1234 | 2005-12-04T23:33 | 2005-12-04T23:35 | 0 | N/A | TRANSMISSION NG | A4 | A4 | ONE SIDE | NORMAL CHARACTER | |
| 5 | E-MAIL TRANSMISSION | ADMINISTRATOR | admin | 2005-12-04T23:5 | 2005-12-04T23:54 | 12 | 1 | TRANSMISSION OK | A4 | A4 | ONE SIDE | 600X300 | TIFF |

FIG. 7 DISPALY SCREEN

| | JOB ID | JOB MODE | USER NAME | DEGREE OF SIMILARITY | CHK |
|---|---|---|---|---|---|
| 1 | 1 | COPY | AAA | 80% | ☒ |
| 2 | 2 | PRINTER | BBB | 70% | ☑ |

SEARCH RESULT LIST                       [FINISH]

LEVEL CHANGE OF TARGET USER

IMAGE PROCESSING APPARATUS FOR CREATING A JOB LOG

BACKGROUND OF THE INVENTION

1. Field of the Invention

The present invention relates to an image processing apparatus for storing a job log of a job and an image processing system.

2. Description of the Related Art

Some of image processing apparatuses, which perform a variety of jobs in a copy mode, a print mode, a scanner mode and a facsimile mode, create and store a job log upon executing a job. As disclosed in Japanese Patent Laid-Open No. 2002-259103, the job log is created when a job such as copying or printing is performed, and is stored in the image processing apparatus or in a management apparatus connected via a network.

Here, the job log is a history of executed image processing, which stores a kind of executed image processing, a user, time and date, image data related to the image processing and the like. The job log is used for a follow-up research for a search of a user who has leaked confidential information.

To extract the user who has leaked the confidential information from such a job log, the image data included in the job log is used. To be more precise, as disclosed in Japanese Patent Laid-Open No. 2006-031181, a comparison is made between the image data of a confidential document and the image data of the job log so as to extract the user who has leaked the confidential information from the job log including matched or similar image data.

There is a high possibility that the user extracted by the follow-up research may perform unauthorized use again. The job log for this user is created with the same contents as those for other users. It is not possible to improve research accuracy of the job log as to a suspicious user.

The job log is stored with the resolution of the image data reduced as much as possible in order to avoid placing a burden on the capacity of a storage medium for storing it. As the resolution of the image data is low, there is a problem that the image becomes smudgy so that an accurate comparison cannot be made when researching the job log.

In view of the problem, an object of the present invention is to provide an image processing apparatus and an image processing system which facilitate management against the unauthorized use by creating the job log according to a usage status of the user.

SUMMARY OF THE INVENTION

To attain the object, the present invention provides an image processing apparatus including a creation section for creating a different job log for each individual user; and a storage section for storing a created job log.

The image processing apparatus creates and stores the job logs which are used when performing maintenance, a trouble analysis, an accounting process, a follow-up research and the like thereof. Here, the job log is history information about performed jobs which includes a user name, time and date of performing the job, image data related to the job, an error history on trouble occurrence, a state of consumables, a communication history with external apparatuses and setting information on the apparatus.

Thus, an amount of information included in the job log changes according to the user. The larger the amount of information is, the more accurate a search becomes. For that reason, it is convenient in the case of researching an unauthorized use.

The image processing apparatus is the one wherein the users are divided into multiple storage levels, and the creation section creates the job logs according to the storage levels. The higher the storage level is, the more detailed the contents of the job log become. The storage level becomes higher as to the user who has a high possibility of performing the unauthorized use.

To be more precise, in the case where the job log includes the image data related to the job, the image data has a different storage condition according to the storage level. The storage condition is a condition for setting what state the image data as the job log should be stored in. For instance, the storage conditions may be a color of the image, resolution, whether or not necessary to create OCR (Optical Character Reader) data and the like.

The image processing apparatus is the one wherein, the higher the storage level is, the finer an image becomes according to the storage condition. When the storage level is high, the image data included in the job log is the inputted image data itself. The lower the storage level is, the grainier the image becomes because the image data is thinned. It is thereby possible to make an exact comparison when researching the job log so that search accuracy can be improved.

The storage condition is either a color image or a monochrome image. When the storage level is high, the image data is rendered as the color image. When the storage level is low, the image data is rendered as the monochrome image. The storage condition is the resolution. The higher the storage level is, the further the resolution of the image data rises. The storage condition is whether or not to create a text image. When the storage level is high, the text image of the image data is created. When the storage level is low, no text image is created.

The creation section creates the job log including all the image data in the case where the image data related to the job includes specific image data. And the creation section creates the job log including part of the image data in the case where the image data related to the job includes no specific image data.

The specific image data indicates that it is the image data of high confidentiality and importance. In the case where the specific image data is included, the creation section determines it to be the image data of high confidentiality and importance, and includes all the image data in the job log. In the case where no specific image data is included, the creation section determines it to be the image data of low confidentiality and importance, and only includes part of the image data in the job log.

There is a high possibility that the user who has copied or printed in an unauthorized manner the image data of high confidentiality and importance may perform the unauthorized use again. Therefore, the image processing apparatus includes a change section for changing the storage level. The change section changes the storage level based on a usage record of the user.

If the user having performed the unauthorized use is found by the follow-up research, the change section changes the setting of the storage condition on the image data related to the user. To be more precise, the change section raises the storage level for the extracted user. The amount of information increases as to the job log related to the user who may perform the unauthorized use again. This facilitates a comparison with original image data so that the follow-up research can be efficiently performed.

The present invention also provides an image processing system having an image processing apparatus connected with a management apparatus for managing a job log via a network, wherein the management apparatus extracts a user who has performed a specific process, and the image processing apparatus changes the job log of the extracted user to be different from the job logs of other users.

The management apparatus collectively stores the job logs created by the image processing apparatus. The management apparatus can constantly research the job logs so as to perform monitoring against the unauthorized use.

BRIEF DESCRIPTION OF THE DRAWINGS

FIG. 2A is the image data including a specific logo such as a company name, FIG. 2B is the image data including specific information indicating being confidential, FIG. 2C is the image data including an important mark indicating being important information, FIG. 2D is the image data including a color image such as a photo, FIG. 2E is the image data composed of multiple pages including the specific logo such as the company name on a first page, and FIG. 2F is the image data composed of multiple pages including the color image such as the photo on the first page;

FIG. 4 is a diagram showing a management table relating to storage conditions;

FIG. 5 is a diagram showing job logs;

FIG. 7 is a diagram showing a setting screen when changing the setting of the storage condition of a user based on a follow-up research.

DETAILED DESCRIPTION OF THE PREFERRED EMBODIMENTS

[First Embodiment]

Figure 1:
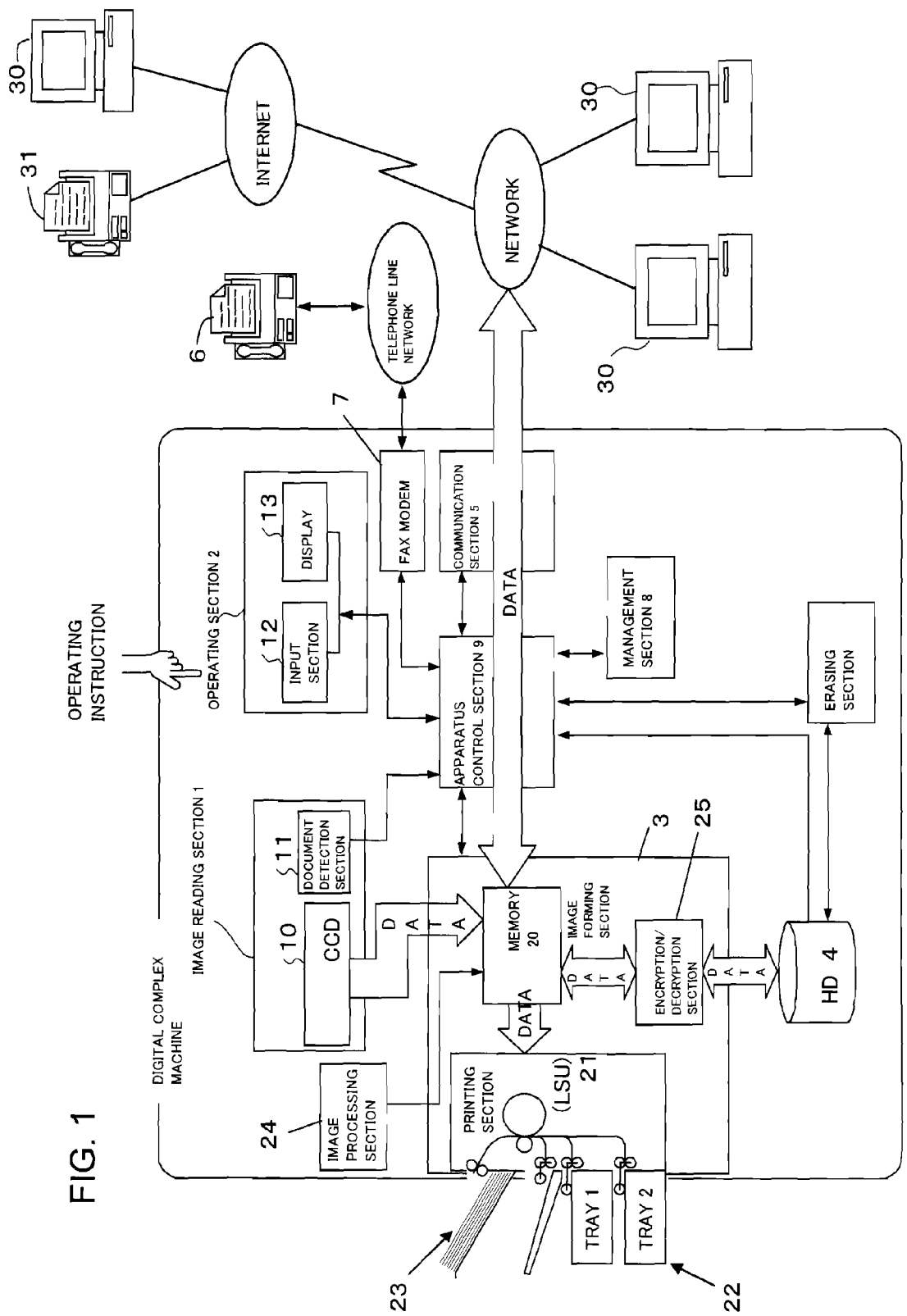
FIG. 1 is a diagram showing a skeleton framework of an image processing system according to the present invention.

FIG. 1 shows an image processing apparatus according to this embodiment. The image processing apparatus is a digital complex machine including a copy mode, a print mode, a scanner mode and a facsimile mode. The image processing apparatus includes an image reading section 1 for reading a document and inputting image data, an operating section 2 for receiving an input from the user, an image forming section 3 for printing inputted image data, a hard disk drive 4 for storing the image data, a communication section 5 for performing data communication with an external apparatus, a FAX modem 7 for performing communication with a facsimile apparatus 6, a management section 8 storing control information and configuration information on the entire apparatus, and a apparatus control section 9 composed of a CPU for controlling the entire apparatus.

The image reading section 1 functions as an image data input section for inputting the image data, and includes an image pickup device such as a CCD 10 and a document detection sensor 11 which detects a document set on a document tray or an automatic document feeder (ADF). The image data on an image read by the CCD 10 is outputted to the image forming section 3.

The operating section 2 includes an operation panel including an input section 12 composed of various input keys and a display 13 such as a liquid crystal display. The display 13 is a touch panel, and also functions as an input section. In the operating section 2, operating instructions of the entire image processing apparatus and various settings are inputted, and input contents and operating conditions of the entire apparatus are displayed. The operating section 2 also functions as the input section for receiving the input of the operating instructions.

The operating section 2 also includes an authentication information input section for inputting the authentication information on the user. The authentication information includes an ID and a password of the user inputted from the input section 12, the authentication information stored in an IC card, and biologic information on the user such as a fingerprint. The authentication information input section reads such authentication information by a heretofore known technique.

The image forming section 3 includes a memory 20 for storing inputted image data, a printing section 21 including a laser scanning unit, a paper feeding section 22 including a manual tray and a cassette tray, a paper ejection section 23 including a catch tray, an image processing section 24 and an encryption/decryption section 25.

The image data inputted to the image forming section 3 is stored in the memory 20. The memory 20 uses a readable and writable semiconductor memory, such as an SDRAM or a flash memory. The memory 20 is divided into an area for storing inputted image data and an area for storing image data to be outputted. Instead of dividedly using one memory 20, it is also possible to use two memories 20 for input and for output respectively.

In the image forming section 3, the inputted image data is stored in the memory 20. The memory 20 stores the image data by overwriting old image data with new image data. The image data undergoes image processing such as compression, extension and modification by the image processing section 24 so as to be stored in the memory 20. The image data having undergone the image processing is outputted to the printing section 21, the hard disk drive 4 or the apparatus control section 9. The printing section 21 prints the image on a recording sheet supplied from the paper feeding section 22 based on the image data stored in the memory 20. Thus, the image forming section 3 functions as a processing section for processing the image data.

The communication section 5 is connected to a router, a switching hub and the like via a LAN cable, and is connected to a network formed by external terminals 30 such as personal computers and servers. The network is connected to the Internet via a communication line such as a telephone line network or an optical fiber. The communication section 5 sends and receives the data to and from the external terminals 30 in the network, and also sends and receives the data and e-mail to and from the external terminals 30 outside through the Internet. Furthermore, the communication section 5 performs Internet facsimile communication with a facsimile apparatus 31 through the Internet. The FAX modem 7 is connected to the telephone line network via a telephone line, and performs facsimile communication with the external facsimile apparatus 6.

Thus, the image processing system is configured by external apparatuses and multiple image processing apparatuses connected through the network. The image data is transmitted and received among the apparatuses.

The communication section 5 and the FAX modem 7 receive and input the image data from the external apparatuses, such as the external terminals 30 and facsimile apparatuses 6 and 31. To be more specific, they function as an image data inputting section. When inputting the image data from the external apparatuses, the communication section 5 simultaneously receives the input of the operating instructions so as to also function as input section. Furthermore, the communication section 5 and the FAX modem 7 perform a process of transmitting the image data to the external apparatuses and thereby function as processing sections.

It is also possible to provide an external communication interface section 14 in order to directly communicate with the external apparatuses apart from the communication through the network. The external communication interface section 14 transmits and receives the data by connecting portable external apparatuses such as a USB apparatus and a memory card thereto. Moreover, the communication by the external communication interface section 14 may be radio communication.

The apparatus control section 9 executes a job to the inputted image data. To be more specific, the apparatus control section 9 controls each of the sections and processes the inputted image data, based on the information stored in the management section 8, according to the input from the operating section 2 and data input from the external apparatuses. Upon execution of the job, one of the copy mode, print mode, scanner mode and facsimile mode is executed according to the inputted image data so that the image is outputted in a desired form.

The hard disk drive 4 temporarily stores the image data. The encryption/decryption section 25 encrypts or decrypts the image data. When storing the image data in the hard disk drive 4, the image data is encrypted by the encryption/decryption section 25. When reading the encrypted image data from the hard disk drive 4, the image data is decrypted.

Next, operation on executing each of the modes will be described. First, in the case of the copy mode, the image data of the document read by the image reading section 1 is outputted as a duplicate from the image forming section 3. To be more precise, the image of the document set in a reading position is read by the CCD 10. The image data outputted from the CCD 10 undergoes image processing on the memory 20 by the image processing section 24 so as to be completed as an output image. The image data is once transferred from the memory 20 to the hard disk drive 4 and is then stored. In the case where there are multiple documents, the operation of reading and storage is repeated.

Thereafter, based on the processing contents specified by the operating section 2, the image data stored in the hard disk drive 4 is sequentially read in adequate timing and is transmitted to the memory 20. The image data is transferred from the memory 20 to the printing section 21 to fit the timing of writing to the printing section 21. The image is printed on a sheet material supplied from paper feeding section 22, and the sheet material is ejected by the paper ejection section 23.

Similarly, in the case of printing the read image data on multiple sheets, the image data is stored as the output image page by page in the hard disk drive 4, and is transmitted from the hard disk drive 4 to the memory 20 according to the mode for outputting. The image data of the memory 20 is repeatedly transferred to the printing section 21 by the number of outputted sheets to fit the timing for writing to the printing section 21.

In the case of the print mode, the image data outputted from an information processing apparatus 30 undergoes an output process. To be more specific, the image data from the information processing apparatus 30 is received by the communication section 5. The apparatus control section 9 transmits the inputted image data to the memory 20, expands it page by page as the image data to be outputted, and once stores it in the hard disk drive 4. The image data is transmitted from the hard disk drive 4 to the memory 20 and then transferred to the printing section 21 as in the case of the copy mode so that the image is printed on the sheet material.

In the case of the scanner mode, the image data of the document read in the image reading section 1 is communicated to an arbitrary information processing apparatus 30 through the network. To be more specific, the image data outputted from the CCD 10 undergoes the image processing on the memory 20 and is completed as an output image so as to be once stored in the hard disk drive 4.

And when transmitting the image data, the image data is transmitted from the hard disk drive 4 to the memory 20. The apparatus control section 9 establishes the communication with a destination in the network specified via the operating section 2, and transmits the image data to the target destination from the communication section 5. Similarly, the image data is also transmitted to the information processing apparatus 30 and the facsimile apparatus 31 which are outside by the communication section 5 from the network through the Internet. In the case of the data communication, the image data can be transmitted by attaching it to e-mail in addition to directly transmitting it. In the case of the facsimile mode, the image data is transmitted from the FAX modem 7 to the facsimile apparatus 6 through the telephone line by the same operation as in the case of the data communication.

Upon completing the processing of the image data inputted from the image data inputting section, an erasing section 26 erases the image data stored in the hard disk drive 4.

When performing a job of processing the image data, the image processing apparatus creates a job log which includes a job history about the job, an error history on trouble occurrence, a state of consumables, a communication history with the external apparatuses and setting information on the apparatus. For instance, the job log is used when performing management of the image processing apparatus including maintenance, a trouble analysis, an accounting process by means of an administrative server which is the external terminal. Here, the processed image data itself is also handled as the job log.

Figure 2:
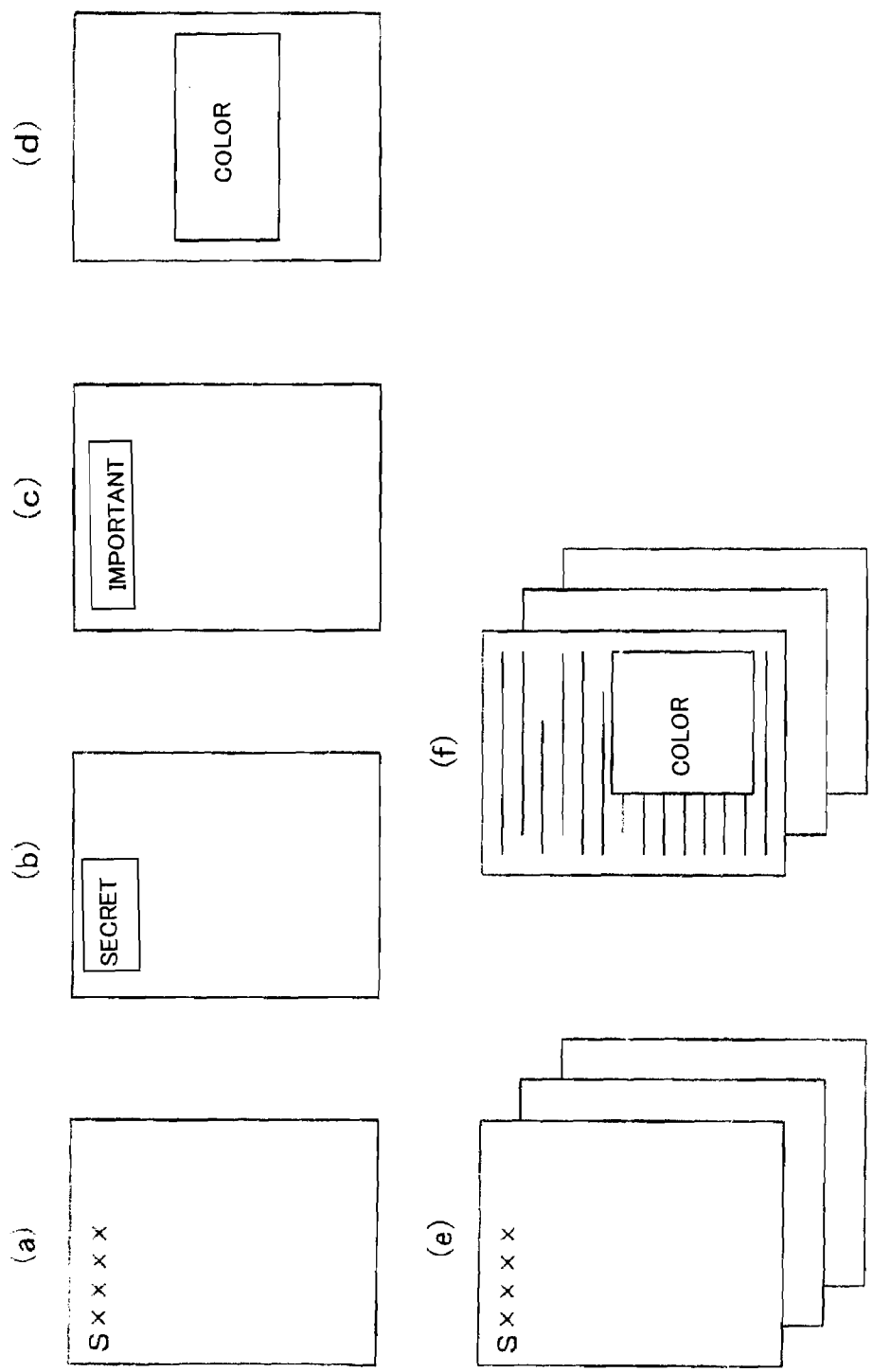
FIG. 2 show examples of image data including predetermined characteristics, where

The job log is also used for a follow-up research for a search of a user who has leaked confidential information. The follow-up research is a kind of a security function, wherein, in the case where it is found afterward that the image data including specific image data as shown in FIG. 2 has been copied or printed in an unauthorized manner for instance, a search is performed as to who has processed the image data including the specific image data. The specific image data refers to specific patterns, such as a secret mark indicating being confidential or important, a company logo mark and color images of a photo, a graph and the like.

Figure 3:
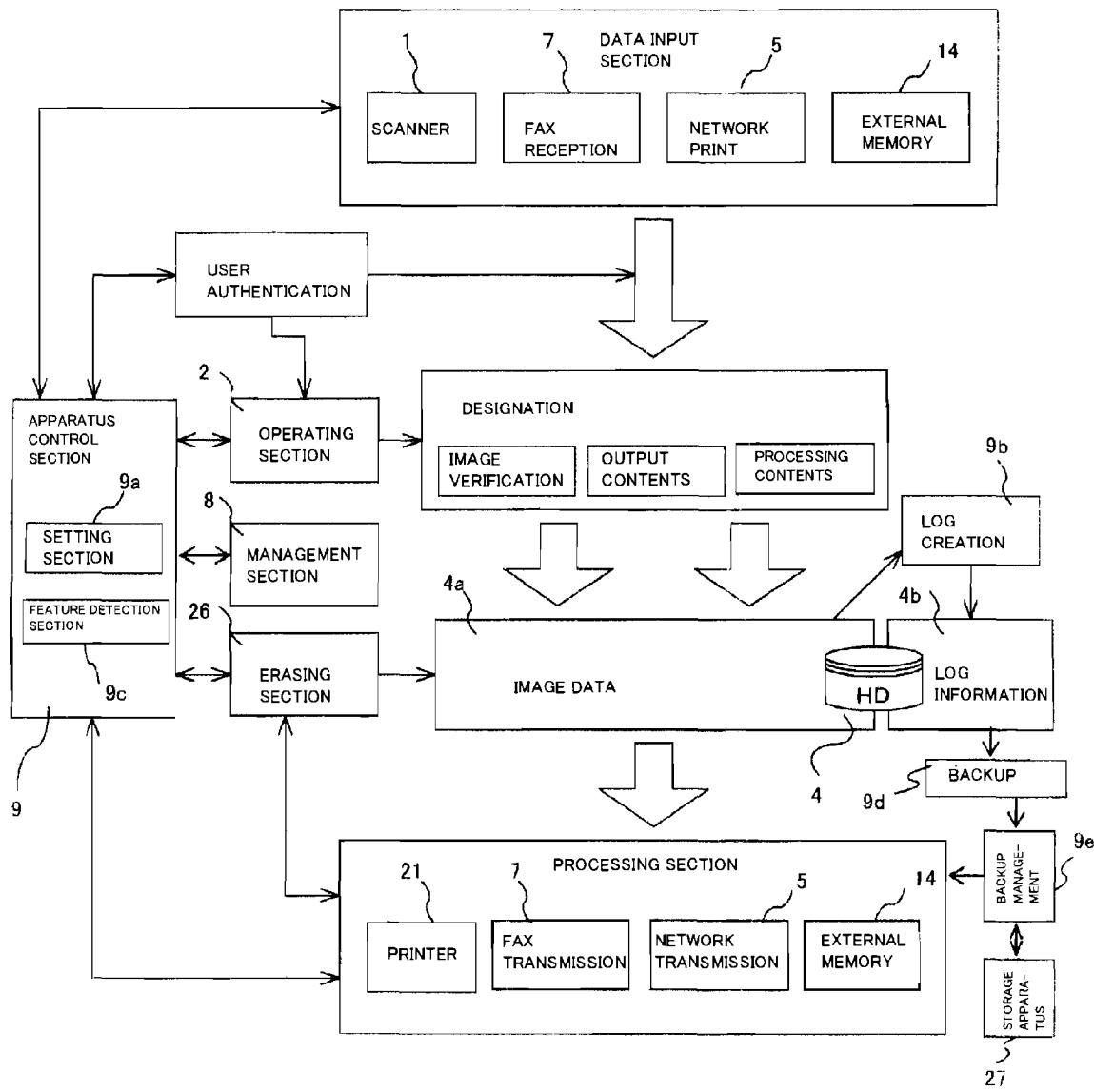
FIG. 3 is a block diagram of an image processing apparatus.
Figure 6:
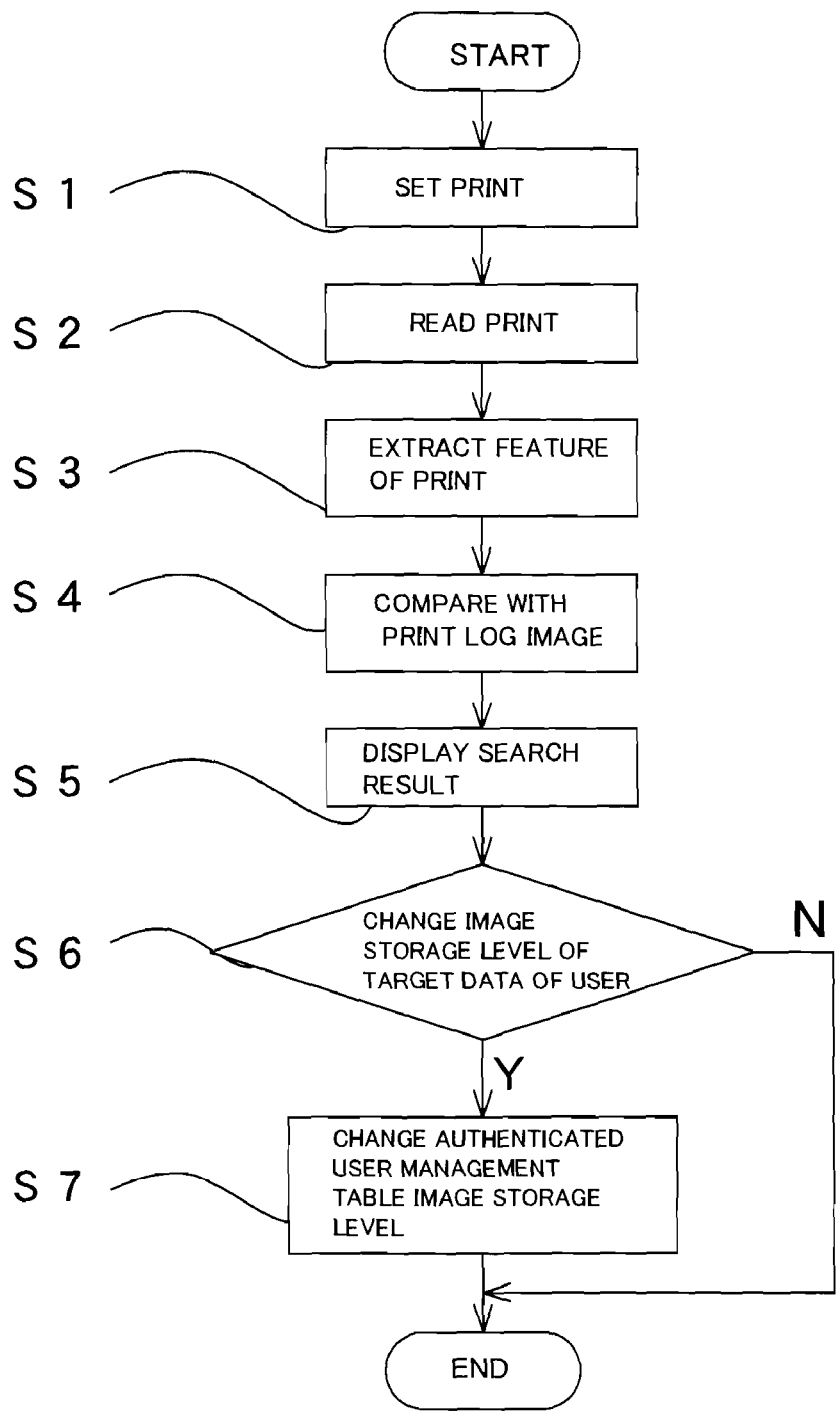
FIG. 6 is a flowchart on setting the storage condition of the job log.

Thus, as shown in FIG. 3, the apparatus control section 9 includes a setting section 9a for setting a storage condition on storing the processed image data as the job log, a creation section 9b for creating the job log on performing a job, a feature detection section 9c for detecting a predetermined feature from the image data inputted by the input section, and a storage section for storing the job log.

The storage section uses the hard disk drive 4. The hard disk drive 4 includes a data storage area 4a for temporarily storing the image data and a log management area 4b for storing the job logs. To be more specific, the storage section stores the created job logs in the log management area 4b. The storage section also collects and stores the information on the error history, state of consumables, communication history and setting information on the apparatus in the log management area 4b as the job log.

The setting section 9*a* includes a management table for managing storage conditions of the job logs as shown in FIG. 4. The management table stores the storage conditions as to each individual user. The storage condition is a condition for setting what form the image data as the job log should be stored in. For instance, the storage conditions may be a storage level, a color of the image, resolution, whether or not necessary to create OCR (Optical Character Reader) data and the like.

The color of the image sets whether the image should be stored as a monochrome image or a color image. The resolution sets a measure for representing fineness and smoothness of the image. The higher the resolution is, the more natural the image is considered and stored. The OCR optically reads a handwritten character and a printed character, and identifies the character by checking it against a pattern stored in advance so as to render it as character data. The OCR data, when created, facilitates a comparison with an original image and text data for instance.

The storage level is a value that ranks a storage state of the image data. With a higher the value of the storage level the image data is stored a high-resolution data, that is a finer image. As for the storage level, the color of the image, resolution, whether or not necessary to create OCR data are provided according to the level. In the case where the storage level is "1" for instance, the image is the monochrome image, the resolution is normal, and the OCR data is not created. In the case where the storage level is "2," the image is the monochrome image, the resolution is high-resolution, and the OCR data is not created. In the case where the storage level is "3," the image is the color image, the resolution is normal, and the OCR data is not created. In the case where the storage level is "4," the image is the color image, the resolution is normal, and the OCR data is created.

The apparatus control section 9 includes a change section for changing the set storage conditions. The change section changes the storage level according to the user. The change by the change section can only be executed by a specific user, such as an administrator of the image processing apparatus or an authorized user.

It is determined whether or not the user is the specific user from user information registered with the management section 8. To be more precise, the determination is made from the authentication information such as the password for checking whether or not the user is the administrator.

The creation section 9*b* creates the job log as shown in FIG. 5 according to the storage conditions. In the case of rendering the job history as the job log, the creation section 9*b* creates the job log including the contents of the image processing and processing time and date. To be more precise, the job log stores job mode, user name, login name, starting time and date, ending time and date, total number of monochrome sheets, total number of color sheets, job result, document size, paper size, print side setting, image quality/resolution, and a file format of the stored image data.

The feature detection section 9*c* detects a feature of the image data by using heretofore known techniques, such as character recognition, image recognition and color recognition. The feature detection section 9*c* is a search section for detecting the feature of the image data from an original document when performing the follow-up research. To be more precise, the feature detection section 9*c* extracts characteristic image data from the image data included in the original document and searches for the image included in the stored job log, which is matched with or similar to the extracted image data. A search result is transmitted to the apparatus control section 9.

The storage conditions set by the setting section 9*a* and a feature result detected by the feature detection section 9*c* are stored in the management section 8, which are referred to by the creation section 9*b* when creating the job log.

The apparatus control section 9 includes a backup section 9*d* for generating backup data of the job log and a backup management section 9*e* for managing the backup data.

The backup section 9*d* encrypts the job log by operating the encryption/decryption section 25 and renders the encrypted information as the backup data, and also decrypts the encrypted backup data to an original job log. The job log is encrypted and decrypted by using an encryption key unique to the apparatus. The backup section 9*d* stores the backup data in a storage apparatus 27 which is different from the hard disk drive 4. The storage apparatus 27 uses a hard disk drive or a nonvolatile memory. The backup section 9*d* executes the backup on occurrence of a new job log, such as an end of the job or collectively backs up multiple job logs at regular intervals.

The backup management section 9*e* creates management information on the job log and adds the management information as header information to the backup data. The backup data to which the header information is added is managed as a backup job log. The management information includes unique information for identifying the image processing apparatus such as a model name and a serial number as well as encryption information. The encryption information is the information on whether or not the encryption has been performed.

As for the management by the backup management section 9*e*, the backup data is not only stored in the different storage apparatus 27 but is also stored in an external storage apparatus. For that reason, the backup management section 9*e* outputs the backup job log in which the management information is added to the backup data to the administrative server.

The external terminal 30 includes the storage apparatuses such as the hard disk drive and nonvolatile memory, and stores the inputted backup job log in the storage apparatuses. Output destinations of the backup data may be not only the external terminal 30 but also a pre-registered external apparatus, the external terminal 30 owned by a specific user or an external apparatus specified by the specific user.

The backup management section 9*e* registers with the management section 8 the name, IP address and MAC address of the external apparatus to which the output of the backup data is allowed and the information on the user to whom the output of the backup data is allowed.

The timing of outputting the backup data is when the backup data is created, when specified by the specific user or at regular time intervals. The apparatus control section 9 makes an output request when the backup data is created or at regular intervals. In this case, the apparatus control section 9 specifies the external apparatus set up as an output destination. The apparatus control section 9 also makes an output request when designated by the user. In this case, the output destination is the external apparatus designated by the user.

Next, a description will be given as to the procedure of creating the job log and consequently storing it. First, when the image data is inputted by the image data input section, the apparatus control section 9 displays a designation input screen on the operation panel of the operating section 2. In this case, the apparatus control section 9 may authenticate the user using the image processing apparatus by requesting the input of the user's authentication information.

The designation input screen selectably displays "image verification," "processing contents" and "output contents" as items. As for the "processing contents," a process of combining the image data with specific information such as a secret mark is performed for instance. In the "output contents," an output method of the image data is designated, such as printing or network transmission. And in the "image verification," feature detection is performed by the feature detection section 9c.

The inputted image data undergoes the processing designated by the "processing contents," and is once stored in the data storage area 4a of the hard disk drive 4. Thereafter, the image data undergoes an output process by the job designated by the "output contents."In the case where the "image verification" is designated, the feature detection section 9c performs a process of detecting the feature from the image data stored in the data storage area 4a.

After the processing by the processing section, the creation section 9b creates the job log so as to store the created job log in the log management area 4b of the hard disk drive 4. In the case of rendering the image data as the job log, the creation section 9b creates and stores the job log of the image data by referring to the storage conditions stored in the management section 8 and a detection result by the feature detection section 9c. Thereafter, the erasing section 26 erases the image data left in the data storage area 4a.

Next, a description will be given as to the setting of the storage conditions for each individual user. The administrator performs an operating input from the input section 12 of the operating section 2. The apparatus control section 9 requests the password in order to check whether or not the operating input is that of the administrator. Once the password is recognized, the apparatus control section 9 displays a setting screen on the display 13. In this case, the apparatus control section 9 identifies and displays the user based on the user information stored in the management section 8.

The administrator changes the setting of a display form as to each individual user. The administrator sets the storage level of the image. Once the storage level is set, the color of the image, resolution, whether or not necessary to create the OCR data are set according to each storage level. As for the setting of a stored form, it is possible to individually set the color of the image, resolution, whether or not necessary to create the OCR data and the like. For instance, even in the case where the storage level is "1," the creation of the OCR data may be set to necessary so as to facilitate a comparison with the original image.

Once the storage conditions are thus set as to all the users, a finish button of the setting screen is pushed. Upon detecting the input from the input section 12, the apparatus control section 9 updates the management table based on the set contents, and finishes the change of setup items of the display form. And the job log is created based on the set storage conditions.

Moreover, a description will be given as to the case of changing the setting of the storage conditions after the follow-up research. First, the administrator performs an operating input to implement the follow-up research from the input section 12 of the operating section 2. The apparatus control section 9 requests the password in order to check whether or not the operating input is that of the administrator. Once the password is recognized, the apparatus control section 9 starts the follow-up research. The administrator sets the original document on the image reading section 1 (S1). The image reading section 1 reads the image of the set original document (S2). The feature detection section 9c of the apparatus control section 9 extracts the feature of the original image from the read image data (S3). The feature detection section 9c searches for the image data out of the job log stored in the management section 8, which is matched with or similar to the feature of the original document (S4). The feature detection section 9c transmits the search result to the apparatus control section 9 (S5).

The apparatus control section 9 displays a search result list as shown in FIG. 7 on the display 13 based on the search result. The search result list is described together with a degree of similarity as to each individual user related to the job log of the image data which is similar to the feature included in the original image. The administrator decides on the user whose storage conditions of the image data should be changed out of the displayed search result list, and checks a check box of the user to be changed (S6). The apparatus control section 9 reads and displays the storage conditions of the checked user from the management section 8. The administrator changes the read storage conditions. To be more precise, the change section changes the setup items such as the storage level, color of the image, resolution, whether or not necessary to create the OCR data based on the operating input from the administrator. For instance, in the case of changing the storage conditions of the user who has performed unauthorized use, the storage level of the image data is raised since there is a high possibility that the user may perform the unauthorized use again.

Once the storage conditions related to the user are set, the finish button of the setting screen is pushed. Upon detecting the input from the input section 12, the apparatus control section 9 updates the management table based on the set contents, and finishes the change of setup items of the display form.

[Second Embodiment]

Next, a second embodiment will be described. This embodiment is different from the first embodiment in the method of setting the storage conditions of the job log. As the image processing apparatus of this embodiment has the same configuration as the image processing apparatus of the first embodiment, the same sections are given the same symbols and a description thereof will be omitted.

According to the method of setting the storage conditions of the job log of this embodiment, the setting is performed so that a storage form of the job log is different, according to whether or not there is a feature, in the case where the original document includes a predetermined feature as shown in FIG. 2.

To be more precise, in the case where the predetermined feature is detected from the image data by the feature detection section 9c, the setting section 9a stores the image data including the feature as the job log. To be more precise, in the case where the feature detection section 9c detects the predetermined features of specific information such as a secret mark indicating being confidential or important, a specific logo such as a company logo mark and color images of a photo, a graph and the like, the setting section 9a performs the setting so as to store the image data including the features as the job log.

The creation section 9b processes the image data including the features according to the setting information and stores the image data as the job log in the log management area 4b. In this case, the job log of the image data which does not include the features is not created, and so the image data is erased from the data storage area 4a by the erasing section 26 at an arbitrary time point.

[Third Embodiment]

Next, a third embodiment will be described. This embodiment performs management of the job logs, the follow-up research on an unauthorized user and a designation for changing the storage conditions of the job logs related to the unauthorized user by means of the administrative server.

To be more precise, according to this embodiment, the image processing apparatus is connected with the administrative server which is a management apparatus for managing the job logs via the network. The administrative server includes a setting section 9a for setting a storage condition, a creation section 9b for creating the job log, a feature detection section 9c for detecting a predetermined feature, a storage section for storing the job log, a change section for changing the storage conditions, a backup section 9d for generating backup data of the job log and a backup management section 9e for managing the backup data. As these sections are the same as the sections provided to the apparatus control section 9 of the first embodiment, a description and operation thereof will be omitted.

The administrative server can have the storage conditions of the image data of the job log set as to each individual user by the setting section 9a. When the administrator registers a new user with one of the image processing apparatuses, the administrative server sets a predetermined storage level to the registered user. The administrator finishes registration of the new user in the case where there is no problem as to the set storage level. In the case where there is a problem as to the set storage level, the administrator changes the setting of the storage level, the color of the image, resolution, whether or not necessary to create the OCR data so as to finish the registration of the new user.

The administrative server can change the storage condition as to the user extracted in the follow-up research. The administrative server collectively stores the job logs created by the image processing apparatus. The administrative server constantly researches the job logs so as to perform monitoring against the unauthorized use. In the case where the user having performed the unauthorized use is extracted during the monitoring, a change is made to the storage condition of the image data related to the extracted user. To be more precise, the storage condition related to the extracted user is read from the image processing apparatus with which the storage condition of the user is registered, and the storage level as the storage condition is raised. The changed storage condition is transmitted to the image processing apparatus from which the storage condition was read so that the image processing apparatus updates the storage condition.

Moreover, the present invention is not limited to the embodiments. As a matter of course, modifications and changes can be made within the scope of the invention. For instance, the present invention has been described by exemplifying the image processing apparatus which is a complex machine including a copier, a facsimile, a scanner and the like. However, the present invention is not limited thereto but is also applicable to a single apparatus, such as a facsimile apparatus, a scanner or a copier.

Moreover, this embodiment has limited the setup items of the storage condition to the image data. However, it is not limited thereto but fineness of the OCR data, a notation of time and date of performing the job or the like may be set as to each individual user.

According to this embodiment, the storage conditions of the image data included in the job log are set as to each individual user. However, it is not limited thereto but the user may be a group other than a person. For instance, the storage conditions can be set as to each individual department or each individual kind of image data for performing the job. It is thereby possible for a department handling a document of high confidentiality to create the job log including more detailed image data.

This embodiment presets specific items only changeable by the administrator as the specific user. However, it is not limited thereto but the specific items may also be rendered changeable by a user permitted by the administrator.

Furthermore, the password is adopted for confirmation of the administrator. However, it is not limited thereto but there are also various usable authentication means, such as vein authentication, fingerprint authentication, facial recognition, corneal recognition, palm recognition and voiceprint recognition.

Moreover, the storage condition of each individual user is stored in each individual image processing apparatus. However, it is not limited thereto but the storage conditions may be collectively stored in the administrative server. In this case, any of the image processing apparatuses connected to the network can create the job log for each individual user according to a usage record of the user.

What is claimed is:

1. An image processing apparatus comprising:
   a setting section configured to set a storage condition for each individual user related to a state that a processed image data should be stored as a job log;
   a creation section configured to create a different job log for each individual user based on the set storage condition;
   a storage section configured to store a created job log, wherein the job log includes image data related to an executed job, and the set storage condition refers to a storage status of the image data that is ranked according to storage level;
   a feature detection section configured to detect a specific image data from image data relating to a job wherein:
   the creation section creates the job log including all the image data related to the job including specific image data in the case where the specific image data is detected by the feature detection section; and
   the creation section creates the job log including part of the image data in the case where the image data related to the job includes no specific image data in the case where the specific image data is not detected by the feature detection section.

2. The image processing apparatus according to claim 1, wherein:
   the storage condition is that the higher the storage level is, the finer an image.

3. The image processing apparatus according to claim 1, wherein:
   the storage condition is either a color image or a monochrome image, wherein when the storage level is high, the image is the color image and when the storage level is low the image is the monochrome image.

4. The image processing apparatus according to claim 1, wherein:
   the storage condition is that the higher the storage level, a resolution becomes higher.

5. The image processing apparatus according to claim 1, wherein:
   the storage condition is whether or not to create a text image, and further wherein when the storage level is high, the text image of the image data is created and when the storage level is low, no text data is created.

6. The image processing apparatus according to claim 1, further comprising:
   a change section configured to change the storage condition,
   wherein the change section changes the storage level based on a usage record of the user as to whether each individual user has processed a specific processing.

7. An image processing system having the image processing apparatus connected with a management apparatus for managing a job log via a network, comprising:
- a setting section configured to set a storage condition for each individual user related to a state that a processed image data should be stored as a job log;
- a changing section configured to change the storage condition;
- a creation section configured to create a different job log for each individual user based on the storage condition;
- a storage section configured to store a created job log, wherein:
- each of the setting section, the changing section, creation section and the storage section is assigned to any of the image processing apparatus and the management apparatus, the job log includes image data related to an executed job, and the storage condition refers to a storage status of the image data that is ranked according to storage level, and further wherein
- the management apparatus extracts a user who has performed a specific process;
- the changing section changes the storage level of the extracted user so as to be higher; and
- a feature detection section configured to detect a specific image data from image data relating to a job wherein:
- the creation section creates the job log including all the image data related to the job including specific image data in the case where the specific image data is detected by the feature detection section; and
- the creation section creates the job log including part of the image data in the case where the image data related to the job includes no specific image data in the case where the specific image data is not detected by the feature detection section.

8. The image processing system according to claim 7, wherein:
- the management apparatus searches for a job log including specific image data out of the stored job logs and extracts the user related to a pertinent job log.

* * * * *